(12) United States Patent
Krishnan et al.

(10) Patent No.: US 11,312,338 B2
(45) Date of Patent: Apr. 26, 2022

(54) SENSOR APPARATUS WITH CLEANING

(71) Applicant: Ford Global Technologies, LLC, Dearborn, MI (US)

(72) Inventors: Venkatesh Krishnan, Canton, MI (US); Raghuraman Surineedi, Dearborn, MI (US); Kunal Singh, Farmington Hills, MI (US); Tyler D. Hamilton, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 16/856,253

(22) Filed: Apr. 23, 2020

(65) Prior Publication Data

US 2021/0331649 A1 Oct. 28, 2021

(51) Int. Cl.
| | |
|---|---|
| *B60S 1/52* | (2006.01) |
| *B60S 1/56* | (2006.01) |
| *G02B 27/00* | (2006.01) |
| *B08B 3/02* | (2006.01) |
| *B60R 1/00* | (2022.01) |

(52) U.S. Cl.
CPC ............ *B60S 1/52* (2013.01); *B08B 3/02* (2013.01); *B60R 1/00* (2013.01); *B60S 1/56* (2013.01); *G02B 27/0006* (2013.01)

(58) Field of Classification Search
CPC .................................. B60S 1/52; B60S 1/56
See application file for complete search history.

(56) References Cited

U.S. PATENT DOCUMENTS

| | | | |
|---|---|---|---|
| 9,663,073 B2 | 5/2017 | Tanaka et al. | |
| 10,422,402 B2 * | 10/2019 | Schmidt et al. | |
| 10,802,121 B1 * | 10/2020 | Krishnan | ................ G01S 17/86 |
| 2018/0201232 A1 | 7/2018 | Ringler et al. | |
| 2019/0256055 A1 | 8/2019 | Gu et al. | |

FOREIGN PATENT DOCUMENTS

| | | |
|---|---|---|
| JP | 2012035654 A | 2/2012 |
| WO | 2019147668 A1 | 8/2019 |

* cited by examiner

*Primary Examiner* — Michael D Jennings
(74) *Attorney, Agent, or Firm* — Frank A. MacKenzie; Bejin Bieneman PLC

(57) ABSTRACT

A sensor apparatus includes a sensor window, a nozzle head coupled to the sensor window and including a first orifice and a second orifice, and a deflector fixed relative to the sensor window. The first orifice is shaped to discharge onto a first region of the sensor window. The second orifice is shaped to discharge onto a second region of the sensor window. The deflector is positioned to deflect at least some of the discharge from the second orifice onto a third region of the sensor window.

16 Claims, 6 Drawing Sheets

SENSOR APPARATUS WITH CLEANING

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

BRIEF SUMMARY

A sensor apparatus includes a sensor window, a nozzle head coupled to the sensor window and including a first orifice and a second orifice, and a deflector fixed relative to the sensor window. The first orifice is shaped to discharge onto a first region of the sensor window. The second orifice is shaped to discharge onto a second region of the sensor window. The deflector is positioned to deflect at least some of the discharge from the second orifice onto a third region of the sensor window.

The sensor window may have a rectangular shape and include four corners defined by the rectangular shape, and the third region may encompass a first corner of the corners of the sensor window. The deflector may be positioned to deflect at least some of the discharge to a fourth region of the sensor window, and the fourth region may encompass a second corner of the corners of the sensor window. The sensor window may include a first short edge, a second short edge, and two long edges defined by the rectangular shape, and the second short edge may connect the first corner and the second corner. The deflector may have an arc shape with a convex surface and a concave surface, and the deflector may be positioned adjacent the second short edge of the sensor window with the concave surface facing toward the sensor window.

The sensor window may have a rectangular shape, the nozzle head may include a cylindrical section including the first orifice and the second orifice, the cylindrical section may define an axis, and the axis may be transverse to a plane defined by the rectangular shape of the sensor window. The first orifice and the second orifice may be spaced from each other along the axis, and the first orifice may be farther from the sensor window along the axis than the second orifice is. The sensor window may include a first half and a second half, the first half and second half of the sensor window may encompass all of the sensor window and be nonoverlapping, the first half may be farther from the nozzle head than the second half is, at least some of the first region may be in the first half of the sensor window, and at least some of the second region may be in the second half of the sensor window. A majority of the first region by area may be in the first half of the sensor window, and a majority of the second region by area may be in the second half of the sensor window.

The deflector may be positioned so that a majority of the discharge from the second orifice passes by the deflector and reaches the second region of the sensor window.

The discharge of the first orifice may have an unimpeded path to the first region.

The sensor apparatus may further include a housing including a front wall, and the sensor window may be positioned in the front wall, and the nozzle head may extend through the front wall. The sensor apparatus may further include a LIDAR sensing device inside the housing and having a field of view through the sensor window.

The nozzle head may include a cylindrical section including the first orifice and the second orifice, the cylindrical section may define an axis, the first orifice may have a direction of discharge forming an acute angle with the axis in a direction along the axis toward the sensor window. The acute angle may be a first acute angle, the second orifice may have a direction of discharge forming a second acute angle with the axis in a direction along the axis toward the sensor window. The first acute angle may be greater than the second acute angle.

DETAILED DESCRIPTION

Figure 1:
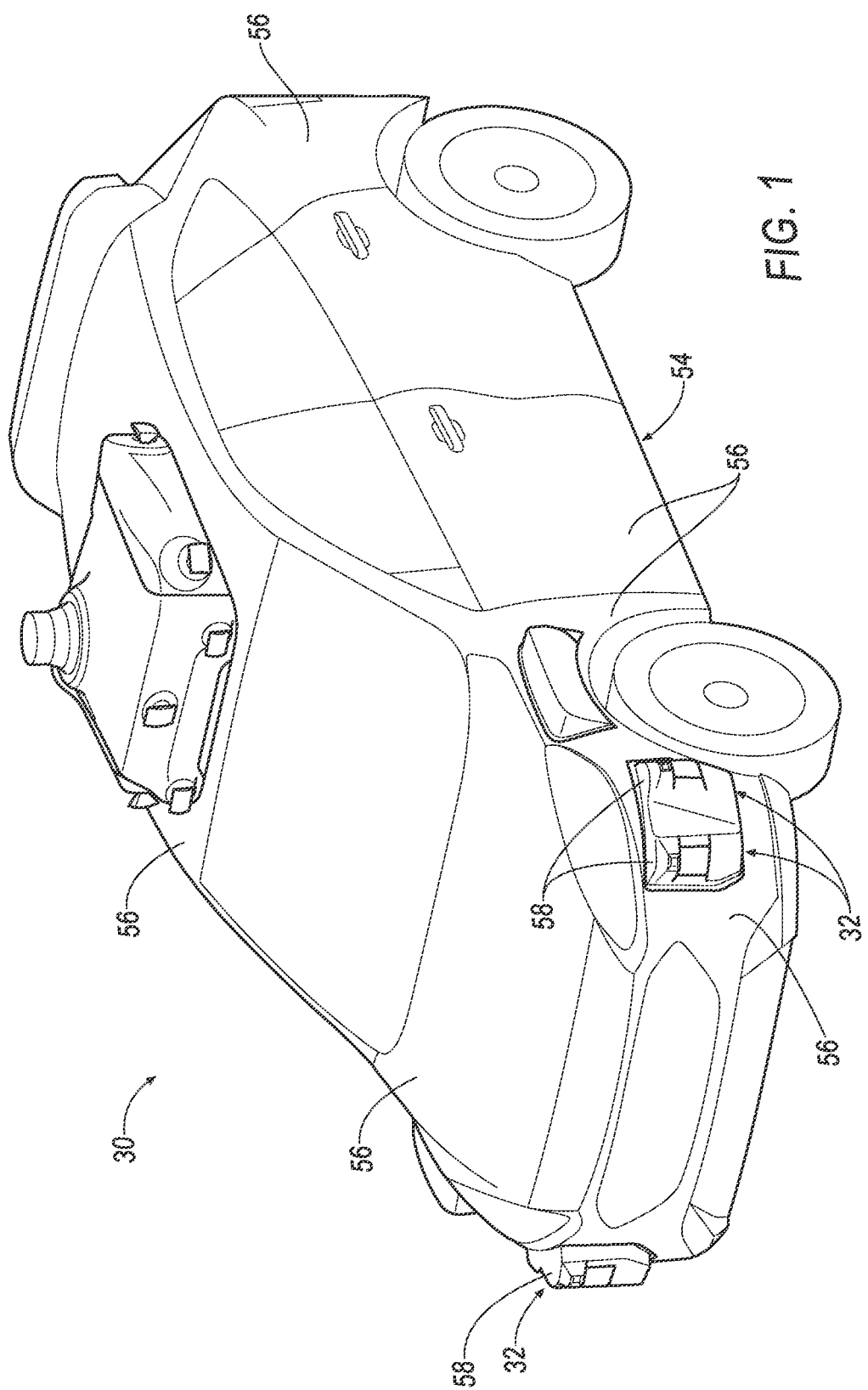
FIG. 1 is a perspective view of an example vehicle.

With reference to the Figures, a sensor apparatus 32 for a vehicle 30 includes a first sensor window 34, a first nozzle head 36 coupled to the first sensor window 34 and including a first orifice 38 and a second orifice 40, and a first deflector 42 fixed relative to the first sensor window 34. The first orifice 38 is shaped to discharge onto a first region 44 of the first sensor window 34. The second orifice 40 is shaped to discharge onto a second region 46 of the first sensor window 34. The first deflector 42 is positioned to deflect at least some of the discharge from the second orifice 40 onto a third region 48 of the first sensor window 34.

The sensor apparatus 32 provides a simple and compact design whereby a single first nozzle head 36 can be used for cleaning an entirety of the first sensor window 34. The first sensor window 34 has a rectangular shape as described below, which is difficult to cover without multiple nozzles arranged around the first sensor window 34. The multiple orifices 38, 40 in the single first nozzle head 36 can usefully cover a full length of the rectangular shape of the first sensor window 34. The first deflector 42 intersecting spray from the second orifice 40 can usefully deflect discharge from the second orifice 40 to cover corners 90, 92, 94 of the first sensor window 34. The orifices 38, 40 and the first deflector 42 provide coverage of the first sensor window 34 that approximates the rectangular shape of the first sensor window 34, thus making efficient use of washer fluid by discharging only small amounts of washer fluid for areas outside the first sensor window 34.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous or semi-autonomous vehicle. A computer can be programmed to operate the vehicle 30 independently of the intervention of a human driver, completely or to a lesser degree. The computer may be programmed to operate the propulsion, brake system, steering, and/or other vehicle systems based on data from vehicle sensors such as light detection and ranging (LIDAR) devices 50, 52 described below. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 30 includes a body 54. The vehicle 30 may be of a unibody construction, in which a frame and the body 54 of the vehicle 30 are a single component. The vehicle 30 may, alternatively, be of a body-on-frame construction, in which the frame supports the body 54 that is a separate component from the frame. The frame and body 54 may be formed of any suitable material, for example, steel, aluminum, etc. The body 54 includes body panels 56 partially defining an exterior of the vehicle 30. The body panels 56 may present a class-A surface, e.g., a finished surface exposed to view by a customer and free of unaesthetic blemishes and defects.

A housing 58 of the sensor apparatus 32 is disposed on and mounted to one of the body panels 56. For example, the housing 58 can be disposed on a front end of the vehicle 30 below a beltline of the vehicle 30, as shown in FIG. 1. While the discussion below is with respect to a single sensor apparatus 32, the vehicle 30 can include multiple sensor apparatuses 32, each with one housing 58 disposed on one of the body panels 56. The housings 58 can be arranged to provide the LIDAR devices 50, 52 therein with a collective field of view entirely around a front end of the vehicle 30.

Figure 2:
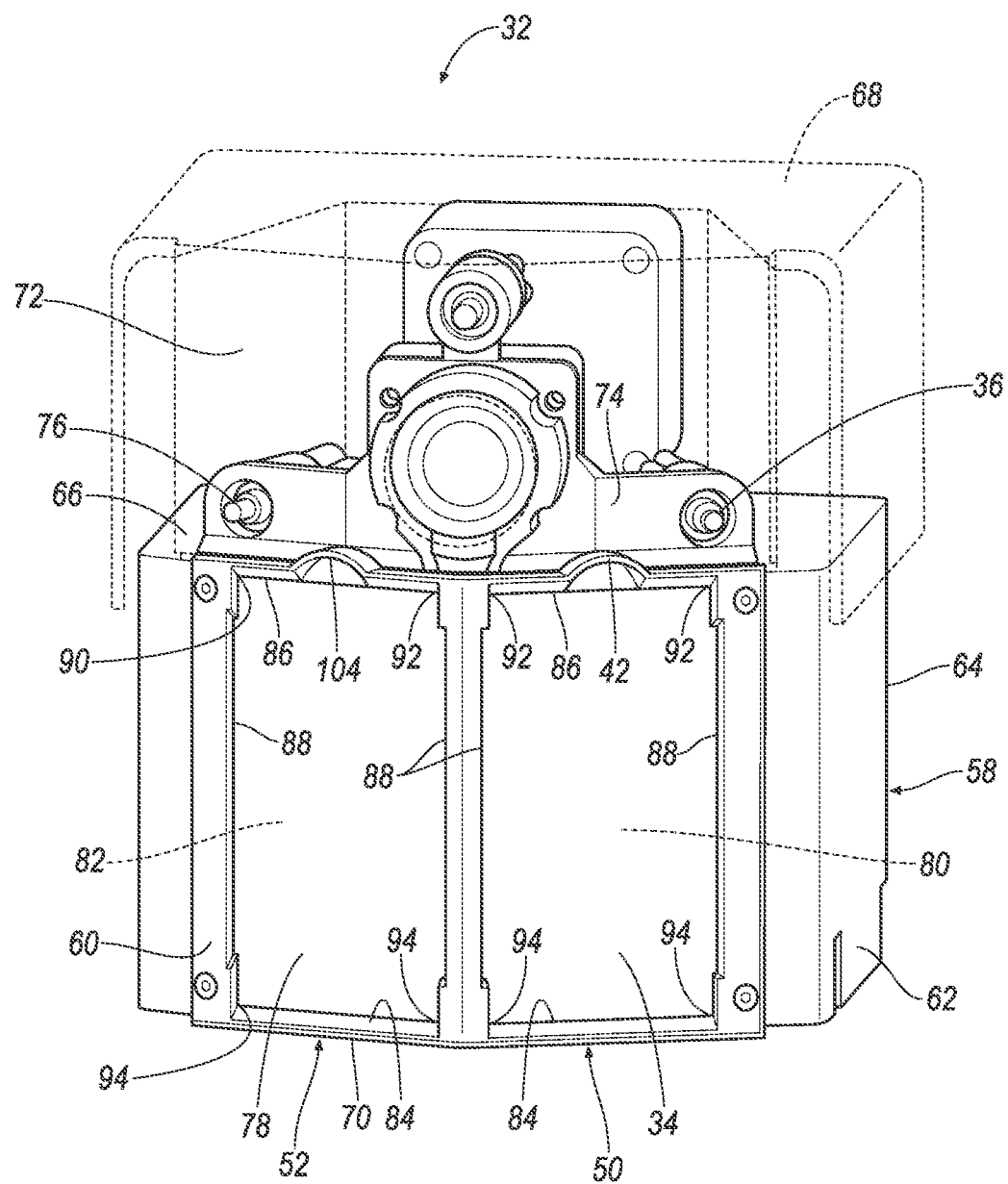
FIG. 2 is a perspective view of a sensor apparatus of the vehicle.

With reference to FIG. 2, the housing 58 includes a front wall 60, two side walls 62, a back wall 64, a chamber floor 66, a chamber ceiling 68, and a bottom wall 70. The front wall 60 and side walls 62 extend vertically from the bottom wall 70 to the chamber floor 66 and from the chamber floor 66 to the chamber ceiling 68. The walls 60, 62, 64, 70 and the chamber ceiling 68 form an exterior of the housing 58. The front wall 60, side walls 62, back wall 64, chamber floor 66, and chamber ceiling 68 form a chamber 72. The front wall 60 faces away from the body 54 of the vehicle 30, i.e., away from the body panel 56 to which the housing 58 is mounted, and the back wall 64 faces toward the body 54 of the vehicle 30, i.e., toward the body panel 56 to which the housing 58 is mounted. The front wall 60 is on an opposite side of the housing 58 from the body panel 56 to which the housing 58 is mounted. The side walls 62 extend from the front wall 60 to the back wall 64. The back wall 64 extends from one of the side walls 62 to the other of the side walls 62. The chamber floor 66, the chamber ceiling 68, and the bottom wall 70 are parallel to each other, and the side walls 62 are parallel to each other.

A bracket 74 is disposed inside the chamber 72. The bracket 74 is fixed to the chamber 72, e.g., to the chamber floor 66 and/or the front wall 60. For example, the bracket 74 can be bolted to an inside of the front wall 60.

The sensor apparatus 32 includes one nozzle head 36, 76 for each sensor window 34, 78, e.g., as shown in the Figures, the first nozzle head 36 and a second nozzle head 76. The nozzle heads 36, 76 are held by the bracket 74 and extend through the front wall 60. For example, the nozzle heads 36, 76 can be attached to the bracket 74 with a press fit or a snap fit. The first nozzle head 36 is disposed above the first sensor window 34 and is aimed at the first sensor window 34, and the second nozzle head 76 is disposed above a second sensor window 78 and is aimed at the second sensor window 78.

The sensor apparatus 32 includes the LIDAR devices 50, 52, a first LIDAR device 50 and a second LIDAR device 52. Each LIDAR device 50, 52 detects distances to objects by emitting laser pulses at a particular wavelength and measuring the time of flight for the pulse to travel to the object and back. The first LIDAR device 50 includes a first LIDAR sensing device 80, and the second LIDAR device 52 includes a second LIDAR sensing device 82. The LIDAR sensing devices 80, 82 are components for emitting and detecting the pulses. The LIDAR sensing devices 80, 82 are disposed inside the housing 58 and between the bottom wall 70 and the chamber floor 66. The first LIDAR sensing device 80 has a field of view through the first sensor window 34, and the second LIDAR sensing device 82 has a field of view through the second sensor window 78.

The first LIDAR device 50 includes the first sensor window 34, and the second LIDAR device 52 includes the second sensor window 78. The first sensor window 34 and second sensor window 78 are fixed relative to the housing 58 and relative to each other. The sensor windows 34, 78 are positioned in the front wall 60 of the housing 58. The sensor windows 34, 78 are positioned below the chamber floor 66.

The first sensor window 34 has a flat rectangular shape and defines a plane. The second sensor window 78 has a flat rectangular shape and defines a different plane than the plane defined by the first sensor window 34. An angle defined by the first sensor window 34 and the second sensor window 78, i.e., an angle at which the portions of the planes defined by the first sensor window 34 and second sensor window 78 intersect, is obtuse.

Each sensor window 34, 78 includes two short edges 84, 86, two long edges 88, and four corners 90, 92, 94 defined by the rectangular shape. The short edges 84, 86 extend horizontally, and the long edges 88 extend vertically. The short edges 84, 86 include a first short edge 84 and a second short edge 86, the second short edge 86 being closer to the respective nozzle head 36, 76 than the first short edge 84 is. The corners 90, 92, 94 include a first corner 90 and a second corner 92, and the second short edge 86 connects the first corner 90 and the second corner 92. The sensor window 34, 78 can be divided into a first half 96 and a second half 98, and the first half 96 and the second half 98 encompass all of the sensor window 34, 78 and are nonoverlapping. The first half 96 is a lower half and extends from a horizontal midline 100 of the respective sensor window 34, 78 to the first short edge 84 and from one of the long edges 88 to the other of the long edges 88. The second half 98 is an upper half and extends from the horizontal midline 100 of the respective sensor window 34, 78 to the second short edge 86 and from one of the long edges 88 to the other of the long edges 88. The first half 96 is farther from the respective nozzle head 36, 76 than the second half 98 is.

Figure 3:
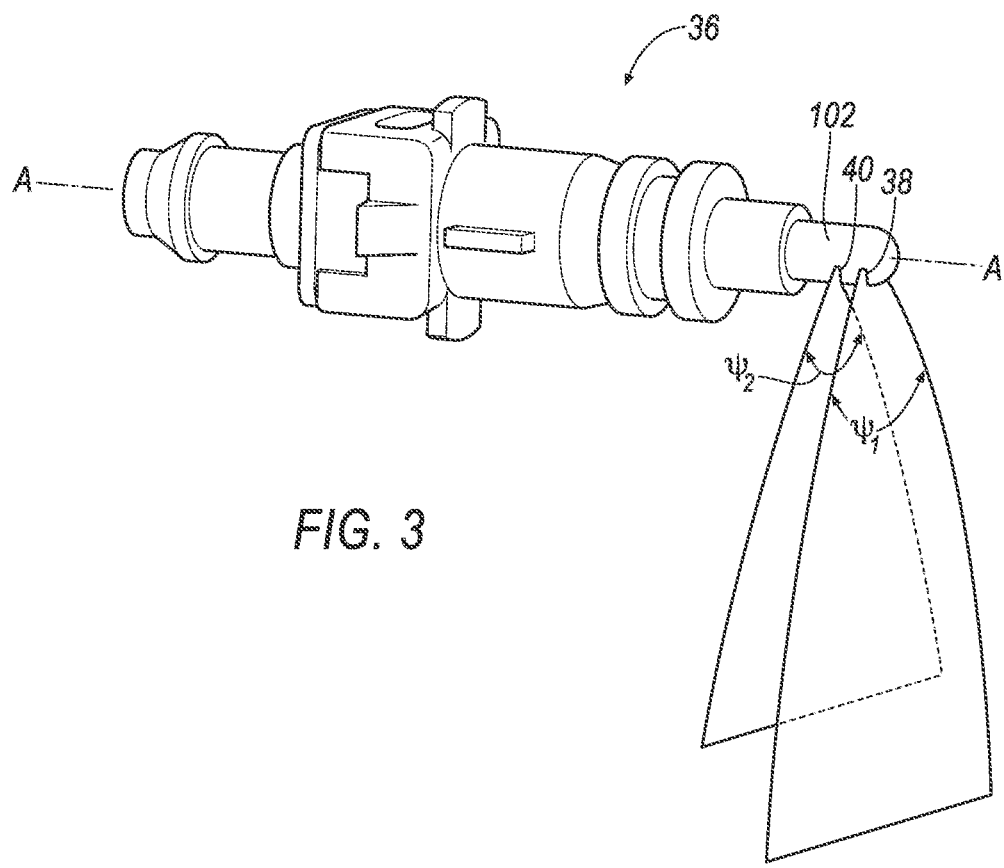
FIG. 3 is a perspective view of a nozzle head.
Figure 4:
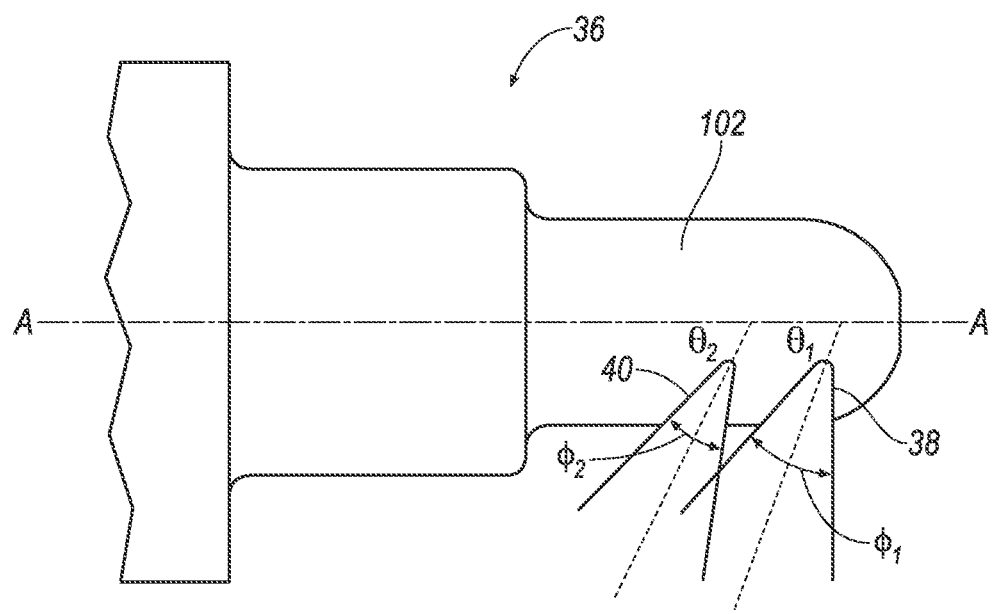
FIG. 4 is a side view of a portion of the nozzle head of the sensor apparatus.

With reference to FIGS. 3 and 4, each nozzle head 36, 76 includes a cylindrical section 102. The cylindrical section 102 for each nozzle head 36, 76 includes the first orifice 38 and the second orifice 40. Each cylindrical section 102 defines an axis A transverse to the plane defined by the rectangular shape of the respective sensor window 34, 78.

Each nozzle head 36, 76, specifically each cylindrical section 102, includes the first orifice 38 and the second orifice 40. The first orifice 38 and the second orifice 40 for each nozzle head 36, 76 are spaced from each other along the axis A. The first orifice 38 is farther from the respective sensor window 34, 78 along the axis A than the second orifice 40 is. The first orifice 38 and the second orifice 40 for each nozzle head 36, 76 are aimed in the same radial direction relative the axis A, e.g., downward.

The orifices 38, 40 are each shaped to emit a spray pattern having a deflection angle $\varphi$ and a spray angle $\psi$. The spray angle $\psi$ is an angular width of the spray measured circumferentially around the axis A. The spray angles $\psi_1$, $\psi_2$ of the first orifice 38 and second orifice 40 can be the same or approximately the same, e.g., 81°. The deflection angle $\varphi$ is an angular thickness measured perpendicular to the spray angle $\psi$. The deflection angle $\varphi_1$ for the first orifice 38 can be greater than the deflection angle $\varphi_2$ for the second orifice 40. For example, the deflection angle $\varphi_1$ for the first orifice 38 can be approximately 42°, and the deflection angle $\varphi_2$ for the second orifice 40 can be approximately 36°. The orifices 38, 40 each have a direction of discharge directed along a center of the spray pattern, i.e., bisecting the spray angle $\psi$ and bisecting the deflection angle $\varphi$. The direction of discharge of the first orifice 38 forms a first acute angle $\theta_1$ with the axis A in a direction along the axis A toward the respective sensor window 34, 78, and the direction of discharge of the second orifice 40 forms a second acute angle $\theta_2$ with the axis A in a direction along the axis A toward the respective sensor window 34, 78. The first acute angle $\theta_1$ is greater than the second acute angle $\theta_2$, meaning that the spray pattern from the first orifice 38 can reach the first half 96 of the respective sensor window 34, 78, which is farther away than the second half 98 is.

Figure 5:
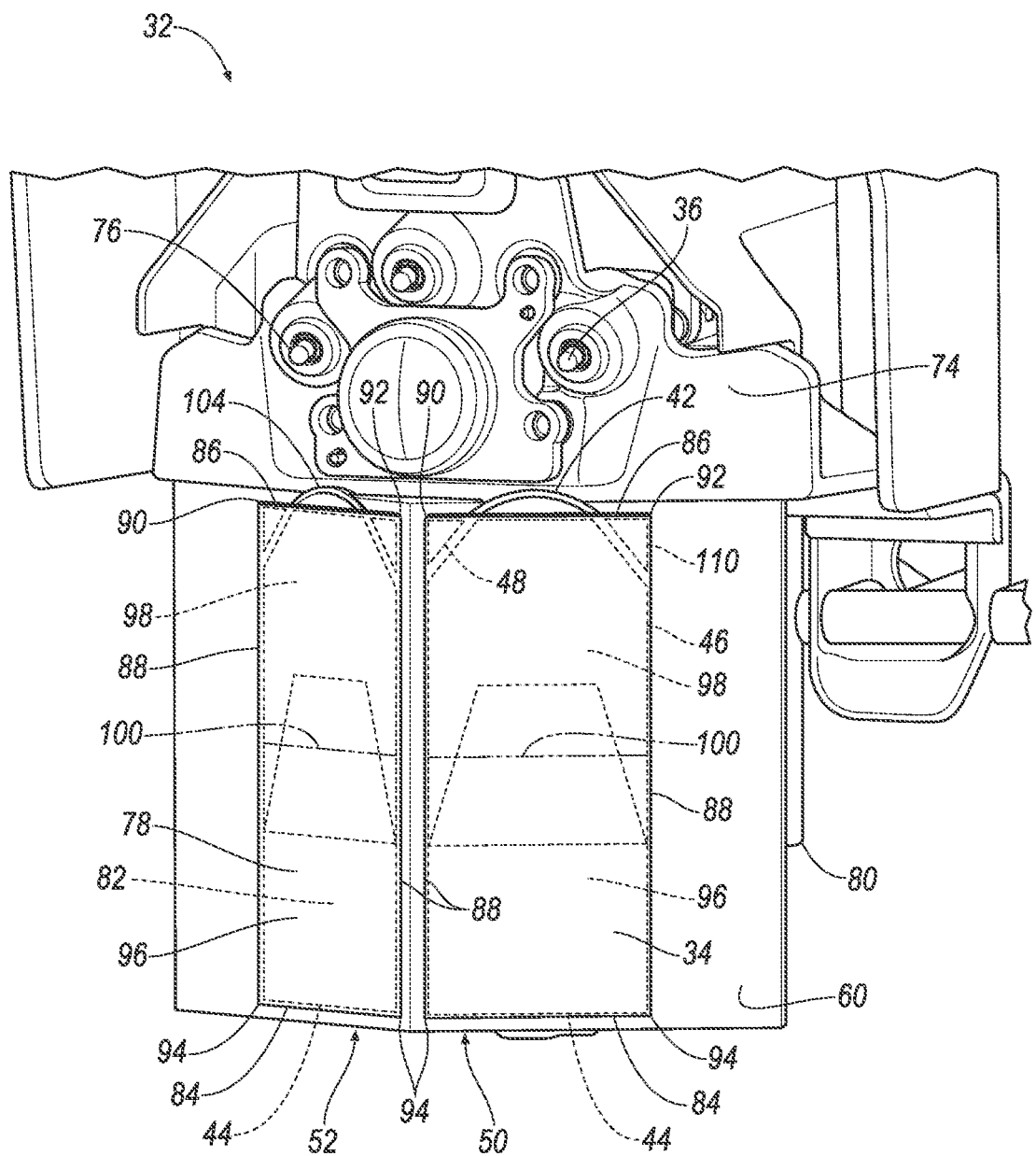
FIG. 5 is a perspective view of a portion of the sensor apparatus with some walls of a housing removed for illustration.

With reference to FIG. 5, each first orifice 38 is shaped to discharge onto the first region 44 of the respective sensor window 34, 78, i.e., the first region 44 is the intersection of the spray pattern from the respective first orifice 38 with the respective sensor window 34, 78. Each second orifice 40 is shaped to discharge onto the second region 46 of the respective sensor window 34, 78, i.e., the second region 46 is the intersection of the spray pattern from the respective second orifice 40 with the respective sensor window 34, 78. At least some of the first region 44, e.g., a majority of the first region 44 by area, is in the first half 96 of the respective sensor window 34, 78. At least some of the second region 46, e.g., a majority of the second region 46 by area, is in the second half 98 of the respective sensor window 34, 78. The first region 44 and the second region 46 can overlap each other.

Figure 6:
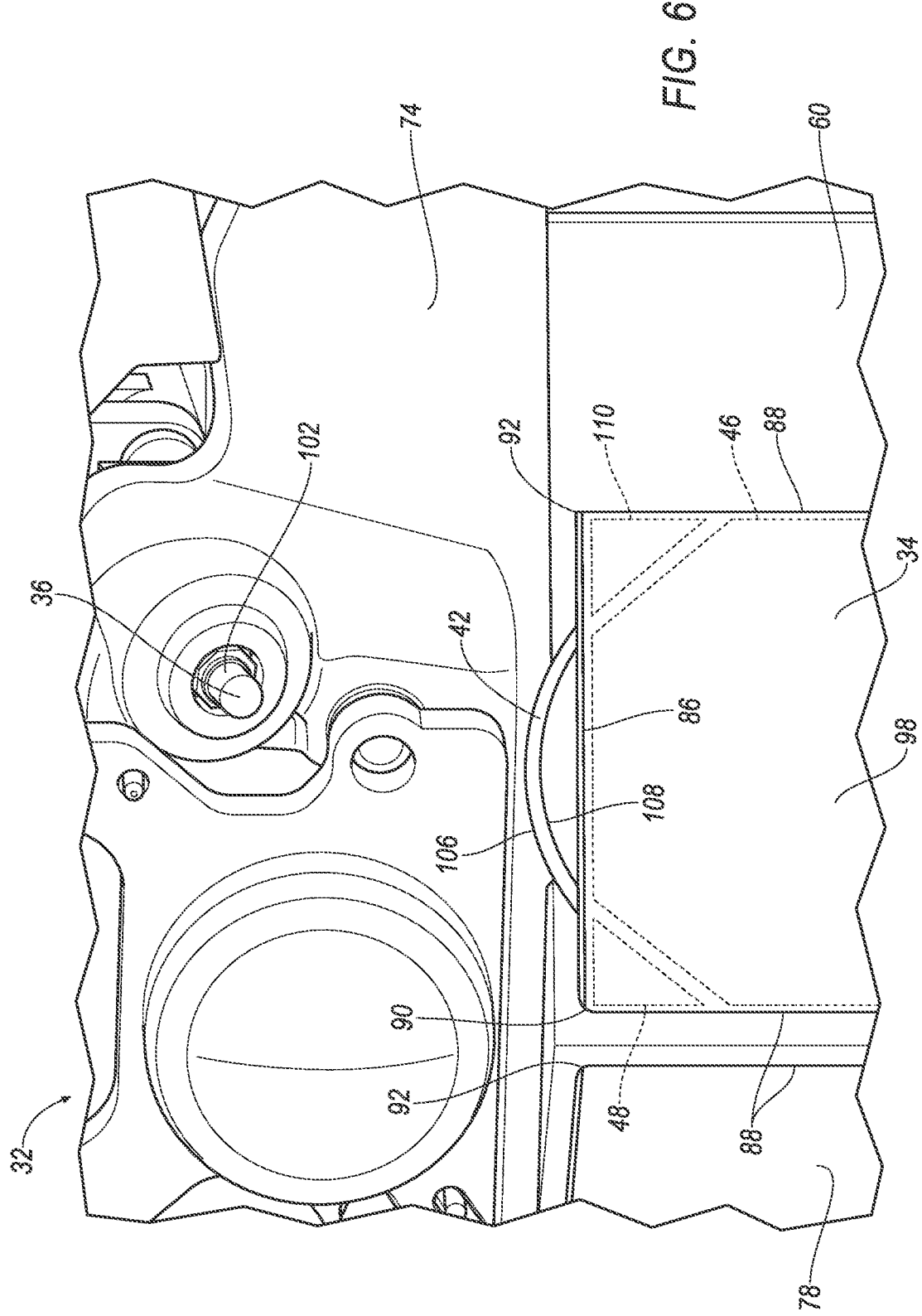
FIG. 6 is a perspective view of a portion of the sensor apparatus with some walls of the housing removed for illustration.
Figure 7:
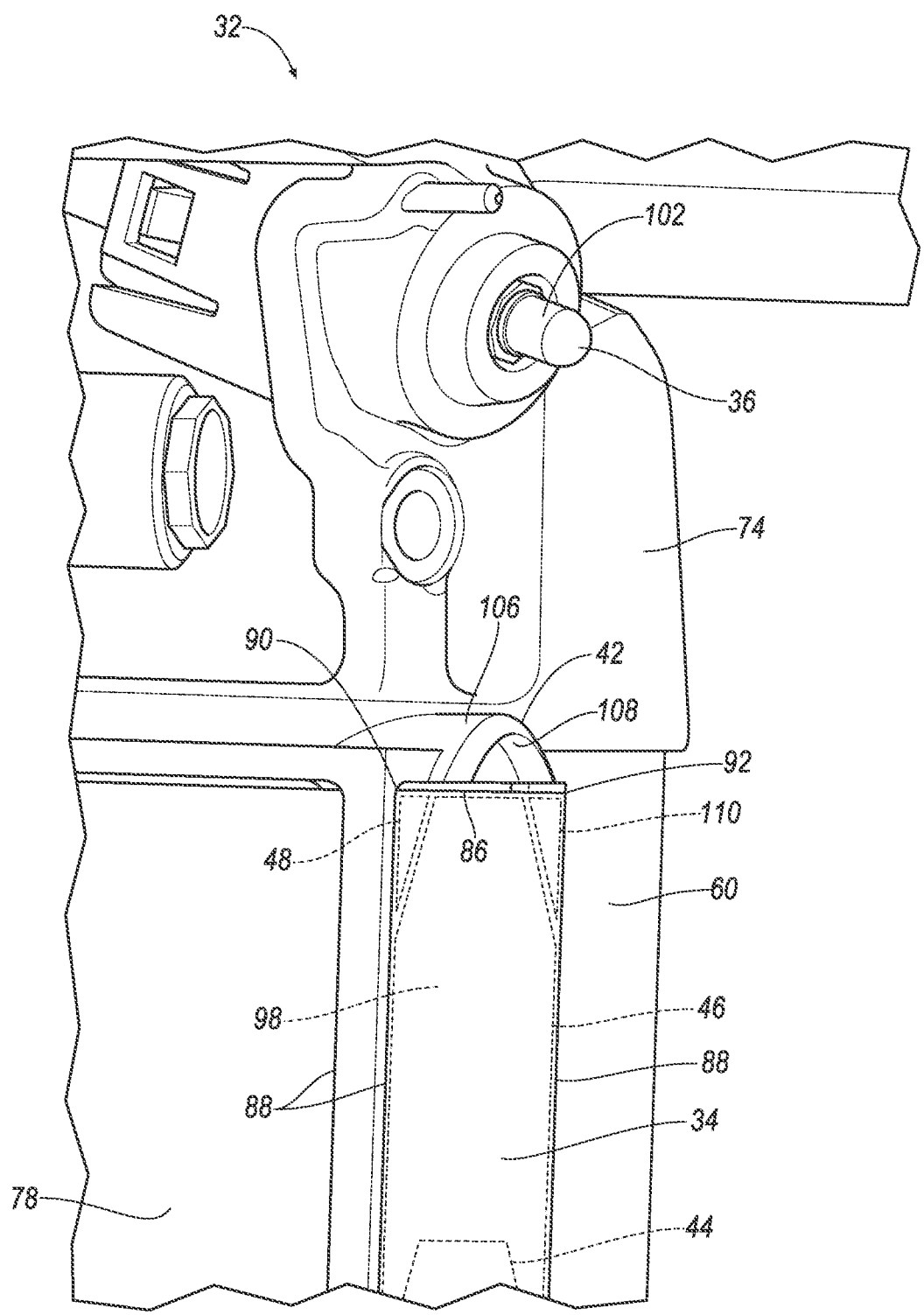
FIG. 7 is a perspective view of a portion of the sensor apparatus with some walls of the housing removed for illustration.

With reference to FIGS. 6 and 7, the sensor apparatus 32 includes the first deflector 42 and a second deflector 104. Each deflector 42, 104 has an arc shape with a convex surface 106 and a concave surface 108. Each deflector 42, 104 is elongated along the arc shape parallel to the plane defined by the respective sensor window 34, 78, and each deflector 42, 104 extends from the front wall 60 perpendicular to the plane defined by the respective sensor window 34, 78. The arc shape is an arc of circle less than 180°, e.g., approximately 90°. The horizontal length of each deflector 42, 104 is less than a length of the respective second short edge 86.

Each deflector 42, 104 is fixed relative to the respective sensor window 34, 78. Each deflector 42, 104 is positioned adjacent the respective second short edge 86 of the respective sensor window 34, 78 with the concave surface 108 facing toward the sensor window 34, 78. Each deflector 42, 104 can be integral with the bracket 74, as shown in the Figures, or alternatively integral with the front wall 60. For the purposes of this disclosure, "integral" is defined as made of a single, uniform piece of material with no seams, joints, fasteners, or adhesives holding it together.

Each deflector 42, 104 is positioned to deflect at least some of the discharge from the respective second orifice 40 to the third region 48 of the respective sensor window 34, 78 and/or to deflect at least some of the discharge from the respective second orifice 40 to a fourth region 110 of the respective sensor window 34, 78. The third region 48 and fourth region 110 are within the second half 98 of each sensor window 34, 78. The third region 48 encompasses the first corner 90 of the respective sensor window 34, 78, and the fourth region 110 encompasses the second corner 92 of the respective sensor window 34, 78. Each deflector 42, 104 can be positioned so that a majority of the discharge from the respective second orifice 40 passes by that deflector 42, 104 and reaches the second region 46 of the respective sensor window 34, 78; i.e., each deflector 42, 104 intersects a minority of the spray pattern of the respective second orifice 40, as measured by cross-sectional area perpendicular to the direction of discharge of that second orifice 40. The minority of the spray pattern from the second orifice 40 is split and deflected by the arc shape of the respective deflector 42, 104 to two directions along the arc shape to reach the third region 48 and fourth region 110 of the respective sensor window 34, 78. The discharge of each first orifice 38 has an unimpeded path to the first region 44 of the respective sensor window 34, 78; i.e., each deflector 42, 104 does not intersect the spray pattern of the respective first orifice 38.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor apparatus comprising:
   a sensor window;
   a nozzle head coupled to the sensor window and including a first orifice and a second orifice; and
   a deflector fixed relative to the sensor window;
   wherein the first orifice is shaped to discharge onto a first region of the sensor window;
   the second orifice is shaped to discharge onto a second region of the sensor window; and
   the deflector is positioned to deflect at least some of the discharge from the second orifice onto a third region of the sensor window.

2. The sensor apparatus of claim 1, wherein the sensor window has a rectangular shape and includes four corners defined by the rectangular shape, and the third region encompasses a first corner of the corners of the sensor window.

3. The sensor apparatus of claim 2, wherein the deflector is positioned to deflect at least some of the discharge to a fourth region of the sensor window, and the fourth region encompasses a second corner of the corners of the sensor window.

4. The sensor apparatus of claim 3, wherein the sensor window includes a first short edge, a second short edge, and two long edges defined by the rectangular shape, and the second short edge connects the first corner and the second corner.

5. The sensor apparatus of claim 4, wherein the deflector has an arc shape with a convex surface and a concave surface, and the deflector is positioned adjacent the second short edge of the sensor window with the concave surface facing toward the sensor window.

6. The sensor apparatus of claim 1, wherein the sensor window has a rectangular shape, the nozzle head includes a cylindrical section including the first orifice and the second orifice, the cylindrical section defines an axis, and the axis is transverse to a plane defined by the rectangular shape of the sensor window.

7. The sensor apparatus of claim 6, wherein the first orifice and the second orifice are spaced from each other along the axis, and the first orifice is farther from the sensor window along the axis than the second orifice is.

8. The sensor apparatus of claim 7, wherein the sensor window includes a first half and a second half, the first half and second half of the sensor window encompass all of the sensor window and are nonoverlapping, the first half is farther from the nozzle head than the second half is, at least some of the first region is in the first half of the sensor window, and at least some of the second region is in the second half of the sensor window.

9. The sensor apparatus of claim 8, wherein a majority of the first region by area is in the first half of the sensor window, and a majority of the second region by area is in the second half of the sensor window.

10. The sensor apparatus of claim 1, wherein the deflector is positioned so that a majority of the discharge from the second orifice passes by the deflector and reaches the second region of the sensor window.

11. The sensor apparatus of claim 1, wherein the discharge of the first orifice has an unimpeded path to the first region.

12. The sensor apparatus of claim 1, further comprising a housing including a front wall, wherein the sensor window is positioned in the front wall, and the nozzle head extends through the front wall.

13. The sensor apparatus of claim 12, further comprising a LIDAR sensing device inside the housing and having a field of view through the sensor window.

14. The sensor apparatus of claim 1, wherein the nozzle head includes a cylindrical section including the first orifice and the second orifice, the cylindrical section defines an axis, the first orifice has a direction of discharge forming an acute angle with the axis in a direction along the axis toward the sensor window.

15. The sensor apparatus of claim 14, wherein the acute angle is a first acute angle, and the second orifice has a direction of discharge forming a second acute angle with the axis in a direction along the axis toward the sensor window.

16. The sensor apparatus of claim 15, wherein the first acute angle is greater than the second acute angle.

* * * * *